(12) United States Patent
Gunther et al.

(10) Patent No.: US 9,985,267 B2
(45) Date of Patent: *May 29, 2018

(54) BUS BAR ATTACHMENT TO BATTERY TERMINALS

(71) Applicant: FORD GLOBAL TECHNOLOGIES, LLC, Dearborn, MI (US)

(72) Inventors: Tommy M. Gunther, Canton, MI (US); Wei Long Qiu, Canton, MI (US); Yunan Guo, Rochester Hills, MI (US); Louis Paspal, Canton, MI (US); Francisco Fernandez, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/609,139

(22) Filed: May 31, 2017

(65) Prior Publication Data

US 2017/0263911 A1    Sep. 14, 2017

Related U.S. Application Data

(62) Division of application No. 14/208,069, filed on Mar. 13, 2014, now Pat. No. 9,698,402.

(51) Int. Cl.
| | |
|---|---|
| *H01M 2/26* | (2006.01) |
| *H01M 2/20* | (2006.01) |
| *B23K 31/02* | (2006.01) |
| *B23K 26/21* | (2014.01) |

(52) U.S. Cl.
CPC ............ *H01M 2/206* (2013.01); *B23K 26/21* (2015.10); *B23K 31/02* (2013.01); *H01M 2/202* (2013.01)

(58) Field of Classification Search
CPC ...... H01M 2/204; H01M 2/206; B23K 26/21; B23K 31/02
See application file for complete search history.

(56) References Cited

U.S. PATENT DOCUMENTS

| | | |
|---|---|---|
| 4,842,534 A | 6/1989 | Mobley et al. |
| 5,162,164 A | 11/1992 | Dougherty et al. |
| 5,853,305 A | 12/1998 | Bedrossian et al. |
| 6,178,106 B1 | 1/2001 | Umemoto et al. |
| 8,409,744 B2 | 4/2013 | Ijaz et al. |
| 2011/0318972 A1 | 12/2011 | Koellmann |
| 2012/0305283 A1 | 12/2012 | Kalayjian et al. |
| 2013/0130070 A1 | 5/2013 | Adachi et al. |
| 2015/0140393 A1* | 5/2015 | Yamamoto .......... H01M 2/1077 429/121 |

FOREIGN PATENT DOCUMENTS

JP    2007144436 A    6/2007

* cited by examiner

*Primary Examiner* — Raymond Alejandro
(74) *Attorney, Agent, or Firm* — David B. Kelley; MacMillan, Sobanski & Todd, LLC

(57) ABSTRACT

An assembly connecting a battery bus bar to battery cell terminals, with the bus bar provided with spring clips. The clips fit over the battery terminals and hold the bus bar and terminals in contact, with welding attaching the clip to the terminals.

5 Claims, 7 Drawing Sheets

BUS BAR ATTACHMENT TO BATTERY TERMINALS

The present application claims the benefit of and is a divisional of U.S. Pat. No. 9,698,402, Issued Jul. 4, 2017, which is incorporated herein in reference.

BACKGROUND OF INVENTION

The present invention relates to a method of making electrical connections between cells within a battery and in particular to an improved method of welding a bus bar between cells in a battery.

Batteries are commonly comprised of one or more electrochemical cells. One known method of making electrical connections between cells in a battery is by using a bus bar. Terminals of the individual battery cells are connected by a bus bar to form a battery. It is advantageous to arrange the terminals so that they may be efficiently and readily connected by the bus bar. For example, the terminals may be arranged in a row so that a straight bus bar makes electrical contact with all of them.

The bus bar is commonly welded to the face of the terminals to achieve effective electrical transmission. Often differences in alignment between the faces of adjoining terminals result in too great of a gap between the terminal face and the bus bar for proper welding. This misalignment may be due to variations in manufacturing of the individual cells.

To assure that the maximum gap allowed by the chosen welding technique is not exceeded, the bus bar is forcibly deformed towards the terminals until the acceptable gap between each terminal and the bus bar is achieved. The bus bar is positioned across the terminals, temporarily held with a tool while the deformation force is applied, and then welded to the terminals. The properties of the bus bar desirable for electrical transmission (for example, material type and mass) may increase the amount of force required for deformation.

SUMMARY OF INVENTION

An embodiment contemplates a method of attaching a bus bar to battery terminals. A clip, having a spring portion integrally formed with first and second legs extending therefrom and substantially parallel to each other, the first and second legs defining a gap, is mounted. First and second terminals are inserted into the gap, wherein the spring portion biases the first and second legs towards opposed sides of the first and second terminals. At least one of the first and second legs is welded to the first and second terminals.

Another embodiment contemplates a method of attaching a bus bar to battery terminals. A first terminal is mounted having a first spring portion integrally formed with a first leg extending substantially parallel to, and biased towards, a second leg, the first and second legs defining a first gap. A second terminal is mounted having a second spring portion integrally formed with a third leg extending substantially parallel to, and biased towards a fourth leg, the third and fourth legs defining a second gap. A conductive bar is inserted into the first and second gaps, wherein the first spring portion biases the first and second legs against opposed sides of the conductive bar and the second spring portion biases the third and fourth legs against opposed sides of the conductive bar. At least one of the first and second legs and one of the third and fourth legs are welded to the bar.

Another embodiment contemplates a battery bus bar clip assembly. A clip has a spring portion integrally formed with first and second legs extending therefrom, substantially parallel to each other, and defining a gap. First and second terminals are inserted into the gap, wherein the spring portion biases the first and second legs towards opposed sides of the first and second terminals. Welds attach at least one of the first and second legs to the first and second terminals.

An advantage of an embodiment is that the bus bar clip will apply pressure to the corresponding battery terminals, which will both hold the clip in position relative to the terminals and seat the clip against the terminals for proper welding. This assures that a gap between the clip and terminals is within the limits for forming a good weld, even if the terminals are misaligned.

DETAILED DESCRIPTION

Figure 1:
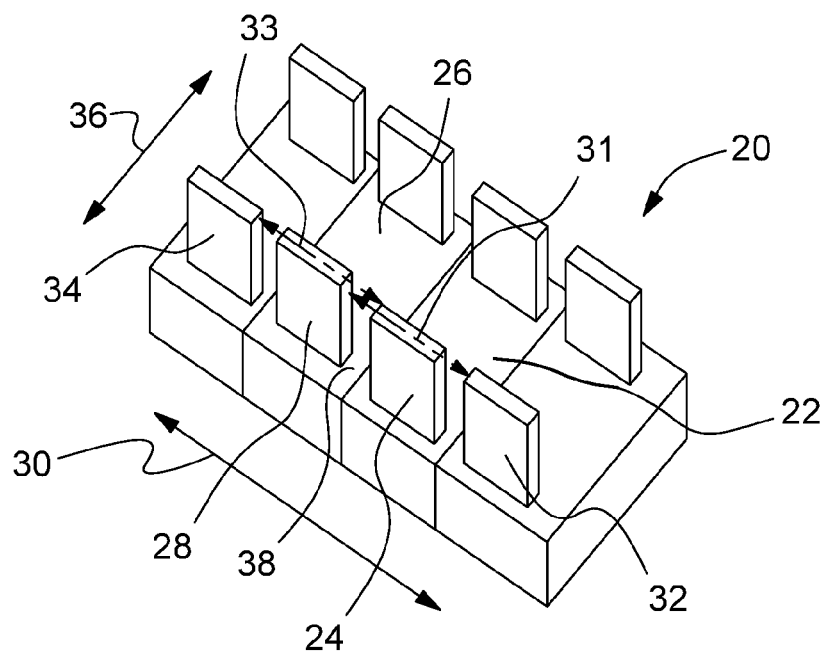
FIG. 1 is a schematic perspective view of cells forming a battery.

Referring now to FIG. 1, there is illustrated a first embodiment of cells forming a battery, indicated generally at 20, constructed in accordance with the present invention. Such a battery is comprised of a first cell 22 having a weldable first terminal 24 with opposing sides in a longitudinal direction and a second cell 26 having a weldable second terminal 28 with opposing sides in the longitudinal direction. The first terminal 24 and the second terminal 28 are generally arrayed in the longitudinal direction 30 with a third terminal 32 and a fourth terminal 34. There is an airgap 38 between the first terminal 24 and the second terminal 28 that prevents, without additional circuitry, electrical conductivity between the first terminal 24 and the second terminal 28.

The first terminal 24 is in a first plane 31 and the second terminal 28 is in a second plane 33. The first plane 31 and the second plane 33 are not coplanar. As illustrated, the first terminal 24 and second terminal 28 are misaligned in a lateral direction 36 despite the first cell 22 and the second cell 26 being aligned in the lateral direction 36. The misalignment of the first terminal 24 and the second terminal 28 may be a result of, for example, permissible tolerances in the manufacturing or installation of the first cell 22 and the second cell 26. One skilled in the art will recognize that the degree of misalignment in the lateral direction 36 between the first terminal 24 and the second terminal 28 will vary and that no misalignment is also possible.

Figure 2:
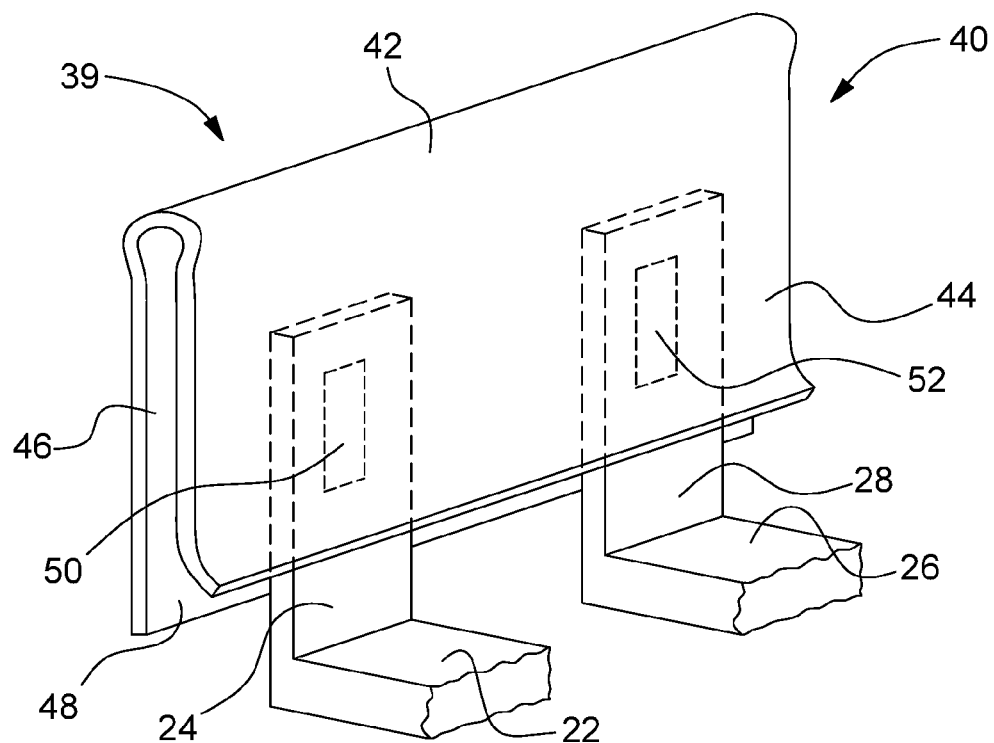
FIG. 2 is a schematic perspective view of a portion of a battery bus bar clip assembly.

Referring now to FIG. 2, there is illustrated a first embodiment of a battery bus bar clip assembly, indicated generally at 39. Such a battery bus bar clip assembly 39, as will be discussed below in detail, uses a spring portion 42 for securing the first terminal 24 of the first cell 22 and the second terminal 28 of the second cell 26 for welding to a bus bar clip 40.

The bus bar clip 40 is provided having a first bus bar clip leg 44 and a second bus bar clip leg 46 extending from the spring portion 42. The first leg 44, the second leg 46, and the spring portion 42 may be integrally formed as a single electrically conductive and weldable piece. The terms "integral" or "integrally" as used herein means that the elements are formed as a single monolithic piece. The first leg 44 and the second leg 46 are substantially parallel to each other and form a gap 48 between their distal ends. The first terminal 24 and the second terminal 28 are inserted into the gap 48. To facilitate insertion into the gap 48, the first terminal 24 and the second terminal 28 may be free standing extensions with separation from the first cell 22 and the second cell 26, respectively.

The spring portion 42 biases the first leg 44 and the second leg 46 toward each other and against the opposing sides of the first terminal 24 and the opposing sides of the second terminal 28. The spring portion 42 creates enough spring force to ensure sufficient surface contact for welding the first terminal 24 and the second terminal 28 to the bus bar clip 40. Also, one or both of the legs 44 and 46 may have an outwardly curving portion at the end, or ends, opposite the spring portion 42 to ease insertion of the terminals 24 and 28 into the gap 48. Once inserted into the gap 48, the bus bar clip 40 is held in place due to the spring force of the spring portion 42 acting on the first and second legs 44 and 46. The first terminal 24 and the second terminal 28 are then welded to the second leg 46 to form a first weld 50 and a second weld 52, respectively, to the bus bar clip 40. The first weld 50 and the second weld 52 may be made using any suitable method of welding. For example, laser welding may be used to weld the first terminal 24 and the second terminal 28 to the second leg 46.

Figure 3:
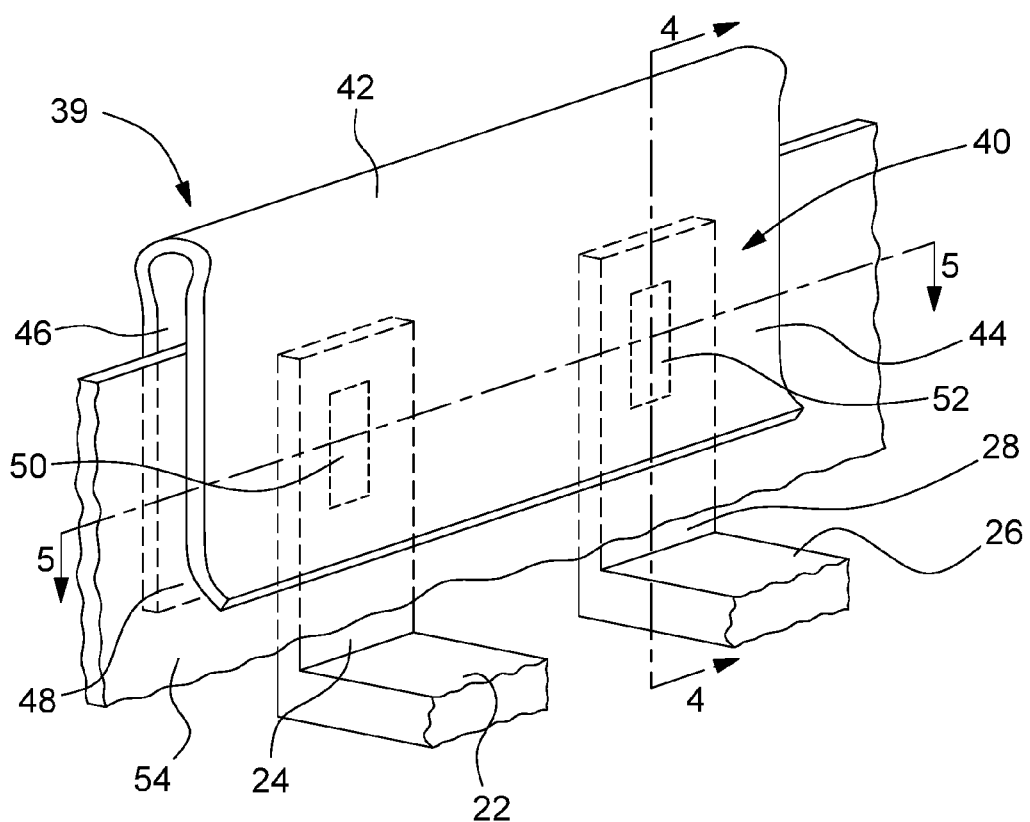
FIG. 3 is a view similar to FIG. 2, but also showing a substrate in an alternate embodiment.
Figure 4:
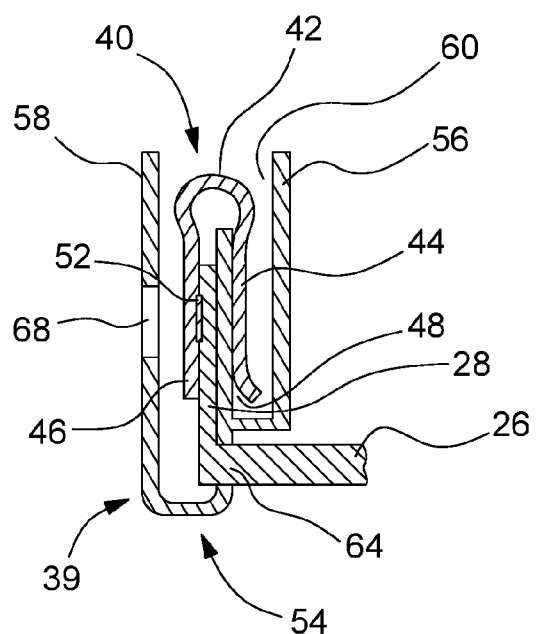
FIG. 4 is a schematic sectional view of a portion of a battery bus bar clip assembly with a substrate, taken along line 4-4 of FIG. 3.
Figure 5:
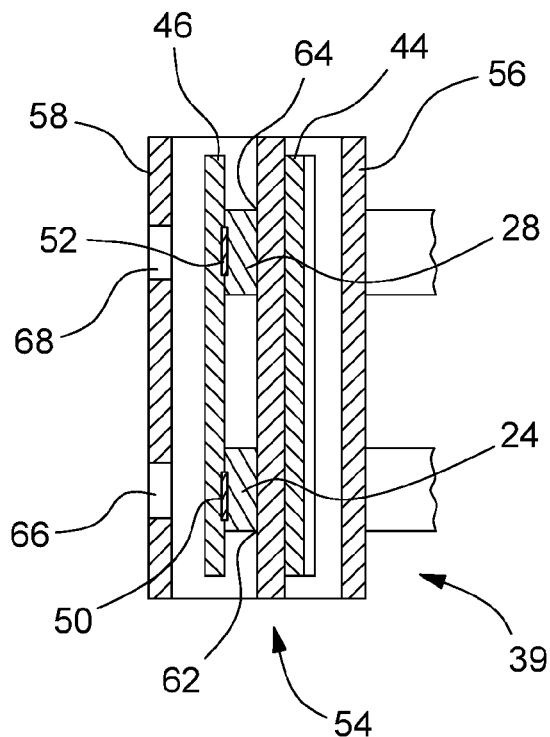
FIG. 5 is a schematic sectional view of a portion of a battery bus bar clip assembly with a substrate, taken along line 5-5 of FIG. 3.

Referring now to FIG. 3 through FIG. 5 there is illustrated another embodiment of the battery bus bar clip assembly, indicated generally at 39. The bus bar clip 40 is provided having the first leg 44 and the second leg 46 extending from the spring portion 42. The first leg 44, the second leg 46, and the spring portion 42 may be integrally formed as a single electrically conductive and weldable piece. The first leg 44 and the second leg 46 are substantially parallel to each other and form the gap 48 between their distal ends. The first terminal 24, the second terminal 28, and a substrate 54 are inserted into the gap 48. The substrate 54 is made of an electrically insulating material. To facilitate insertion into the gap 48, the first terminal 24 and the second terminal 28 may be free standing extensions with separation from the first cell 22 and the second cell 26.

The spring portion 42 biases the first leg 44 against the substrate 54, the second leg 46 against the first terminal 24 and the second terminal 28, and the substrate 54 against the first terminal 24 and the second terminal 28. The spring portion 42 creates enough spring force to ensure sufficient surface contact for welding the first terminal 24 and the second terminal 28 to the bus bar clip 40. Also one or both of the legs 44 and 46 may have an outwardly curving portion at the end, or ends, opposite the spring portion 42 to ease insertion of the terminals 24 and 28 into the gap 48. Once inserted into the gap 48, the bus bar clip 40 is held in place due to the spring force of the spring portion 42 acting on the first and second legs 44 and 46. The first terminal 24 and the second terminal 28 are then welded to the second leg 46 to form the first weld 50 and the second weld 52, respectively. The first weld 50 and the second weld 52 may be made using any suitable method of welding. For example, laser welding may be used to weld the first terminal 24 and the second terminal 28 to the second leg 46.

The substrate 54 is provided with a first substrate leg 56 and a second substrate leg 58. The first substrate leg 56 is generally parallel to the first clip leg 44 and the second substrate leg 58 is generally parallel to the second clip leg 46. The first substrate leg 56 and the second substrate leg 58 define a housing 60 for the first terminal 24, the second terminal 28, and the bus bar clip 40. The electrically insulating substrate 54 is a guard that protects from accidental contact with the first terminal 24, the second terminal 28, or the bus bar clip 40.

The substrate 54 shielding the bus bar clip 40 has the potential to interfere with the formation of the first weld 50 and the second weld 52. To allow formation of the first weld 50 and the second weld 52, the second substrate leg 58 is provided with a first weld opening 66 and a second weld opening 68 corresponding to the location of the first weld 50 and the second weld 52, respectively. Additionally, the substrate 54 is provided with a first terminal slot 62 and a second terminal slot 64 that allow the substrate 54 to be fit over the first terminal 24 and the second terminal 28, respectively.

Figure 6:
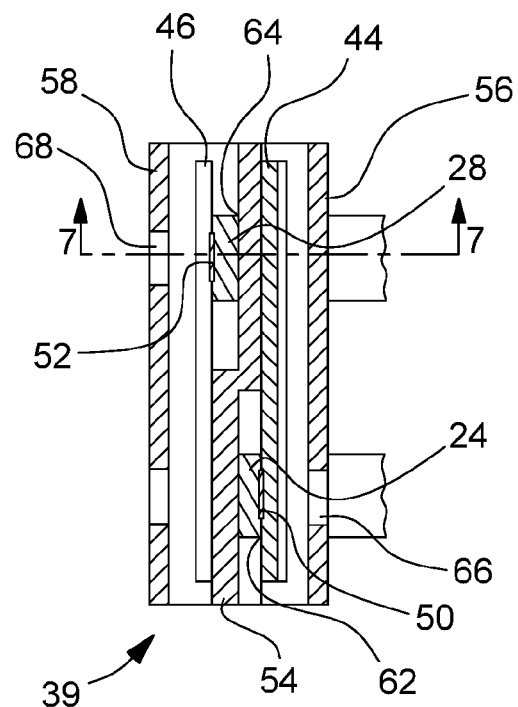
FIG. 6 is a schematic sectional view of a portion of a battery bus bar clip assembly with a substrate, similar to FIG. 5, but illustrating a different embodiment.

Referring now to FIG. 6 there is illustrated another embodiment of the battery bus bar clip assembly, illustrated generally at 39. Since the bus bar clip assembly in this embodiment is a modification of the embodiment of FIGS. 4 and 5, like reference numerals designate corresponding parts in the drawings and detailed description thereof will be omitted. The bus bar clip 40 is provided with the first leg 44 and the second leg 46 extending from the spring portion 42. The first leg 44, the second leg 46, and the spring portion 42 may be integrally formed as a single electrically conductive and weldable piece. The first leg 44 and the second leg 46 are substantially parallel to each other and form the gap 48 between their distal ends. The first terminal 24, the second terminal 28, and the substrate 54 are inserted into the gap 48. The substrate 54 is made of an electrically insulating material. To facilitate insertion into the gap 48, the first terminal 24 and the second terminal 28 may be free standing extensions with separation from the first cell 22 and the second cell 26, respectively.

The spring portion 42 biases the first leg 44 against the first terminal 24 and the substrate 54, the second leg 46 against the second terminal 28 and the substrate 54, and the substrate 54 against the first terminal 24 and the second terminal 28. This embodiment is similar to that in FIG. 3-6, except that the substrate 54 is biased against opposite sides of the first and second terminals 24 and 26 (best seen in FIG. 6). The spring portion 42 creates enough spring force to ensure sufficient surface contact for welding the first terminal 24 and the second terminal 28 to the bus bar clip assembly 40. Also one or both of the legs 44 and 46 may have an outwardly curving portion at the end, or ends, opposite the spring 42 to ease insertion of the terminals 24 and 28 into the gap 48. Once inserted into the gap 48, the bus bar clip 40 is held in place due to the spring force of the spring portion 42 acting on the first and second legs 44 and 46. The first terminal 24 is then welded to the first leg 44 and the second terminal 28 is then welded to the second leg 46 to form the first weld 50 and the second weld 52, respectively. The first weld 50 and the second weld 52 may be made using any suitable method of welding. For example, laser welding may be used to weld the first terminal 24 and the second terminal 28 to the second leg 46.

The substrate 54 is provided with the first substrate leg 56 and the second substrate leg 58. The first substrate leg 56 is generally parallel to the first clip leg 44 and the second substrate leg 58 is generally parallel to the second clip leg 46. The first substrate leg 56 and the second substrate leg 58 define the housing 60 for the first terminal 24, the second terminal 28, and the bus bar clip 40. The substrate 54 is a guard that protects from accidental contact with the first terminal 24, the second terminal 28, or the bus bar clip assembly 40.

The substrate 54 has potential to interfere with the formation of the first weld 50 and the second weld 52 due to its shielding the bus bar clip 40, the first terminal 24, and the second terminal 28. To allow formation of the first weld 50 and the second weld 52, the first substrate leg 56 is formed with the first weld opening 66 and the second substrate leg 58 is formed with the second weld opening 68 corresponding to the location of the first weld 50 and the second weld 52, respectively. Additionally, the substrate 54 is provided with a first terminal slot 62 and a second terminal slot 64 that allow the substrate 54 to be fit over the first terminal 24 and the second terminal 28, respectively.

Figure 7:
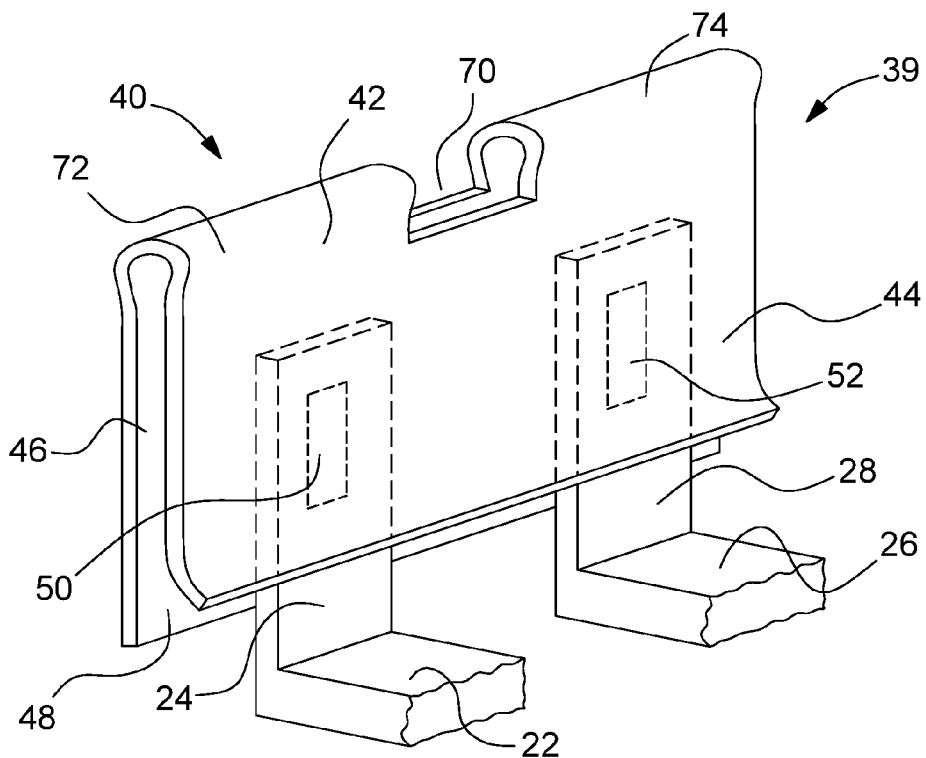
FIG. 7 is a schematic perspective view of a portion of a battery bus bar clip assembly, similar to FIG. 2 but adding a notch.

Referring now to FIG. 7 there is illustrated another embodiment of the battery bus bar clip assembly, indicated generally at 39. The bus bar clip 40 is provided with the first leg 44 and the second leg 46 extending from the spring portion 42. The spring portion 42 is provided with a notch 70. The size of the notch 70 may be adjusted to increase or reduce the spring force produced by the spring portion 42 acting on the first and second legs 44 and 46. The spring force produced by the spring portion 42 is reduced as the notch 70 increases in size. The notch 70 divides the spring portion 42 into a first spring portion 72 corresponding to the first terminal 24 and a second spring portion 74 corresponding to the second terminal 28. The first spring portion 72 and the second spring portion 74, in combination with the size of notch 70, may allow for differential flexure of the first leg 44 between the first terminal 24 and the second terminal 28.

The first leg 44, the second leg 46, and the spring portion 42 may be integrally formed as a single electrically conductive and weldable piece. The first terminal 24 and the second terminal 28 may be inserted into the gap 48 and welded, as discussed relative to FIG. 2, to produce welds 50 and 52.

Figure 8:
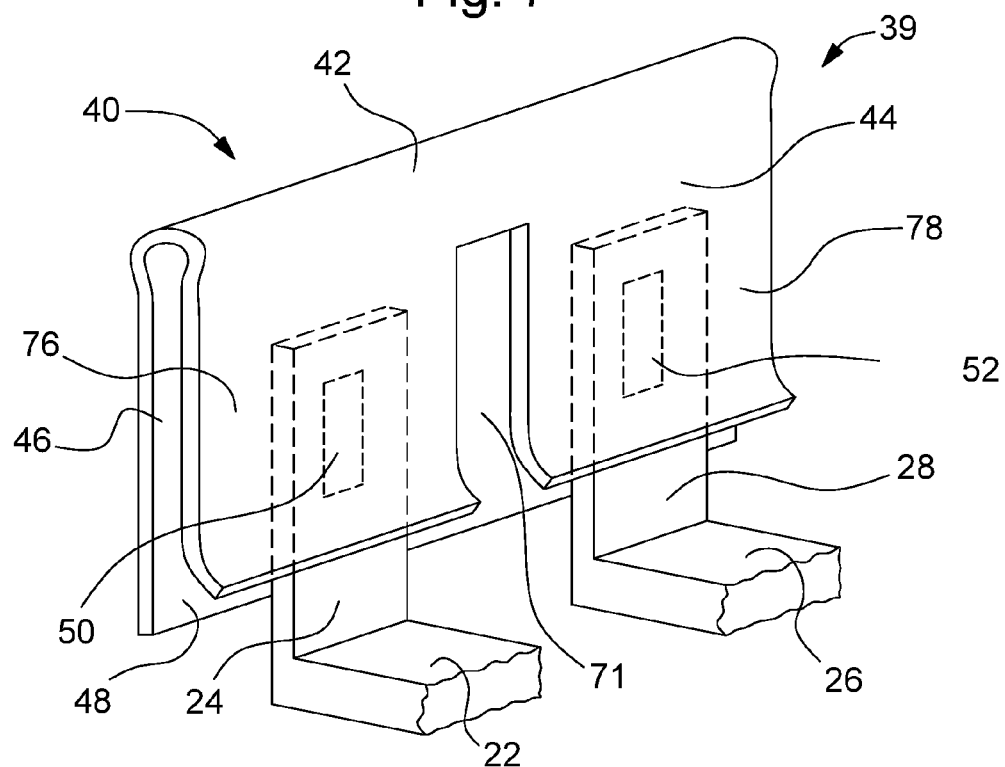
FIG. 8 is a schematic perspective view of a portion of a battery bus bar clip assembly, similar to FIG. 2 but adding a slot.

Referring now to FIG. 8 there is illustrated another embodiment of the battery bus bar clip assembly, indicated generally at 39. Since the bus bar clip assembly 39 in this embodiment is a modification of earlier embodiments, like reference numerals designate corresponding parts in the drawings and detailed description thereof will be omitted. In this embodiment, the first leg 44 is provided with a slot 71. The slot 71 divides the first leg 44 into a first area 76 corresponding to the portion of the first leg 44 contacting the first terminal 24 and a second area 78 corresponding to the portion of the first leg 44 contacting the second terminal 28. The slot 71 may be the full height of the first leg 44 (the full height of the first leg 44 being from its distal end to the spring portion 42) or the slot 71 may be some height less than the full height of the first leg 44. The size of the slot 71 may be adjusted to increase or reduce flexure of the first leg 44 between the first area 76 and the second area 78. Flexure between the first area 76 and the second area 78 increases as the size of the slot 71 increases. One skilled in the art will recognize that the slot 71 may be alternatively located in the second leg 46 in lieu of the first leg 44 or in both the first leg 44 and the second leg 46. This slot 71 may also be employed in the bus bar clips of any of the previous embodiments discussed herein, if so desired.

Figure 9:
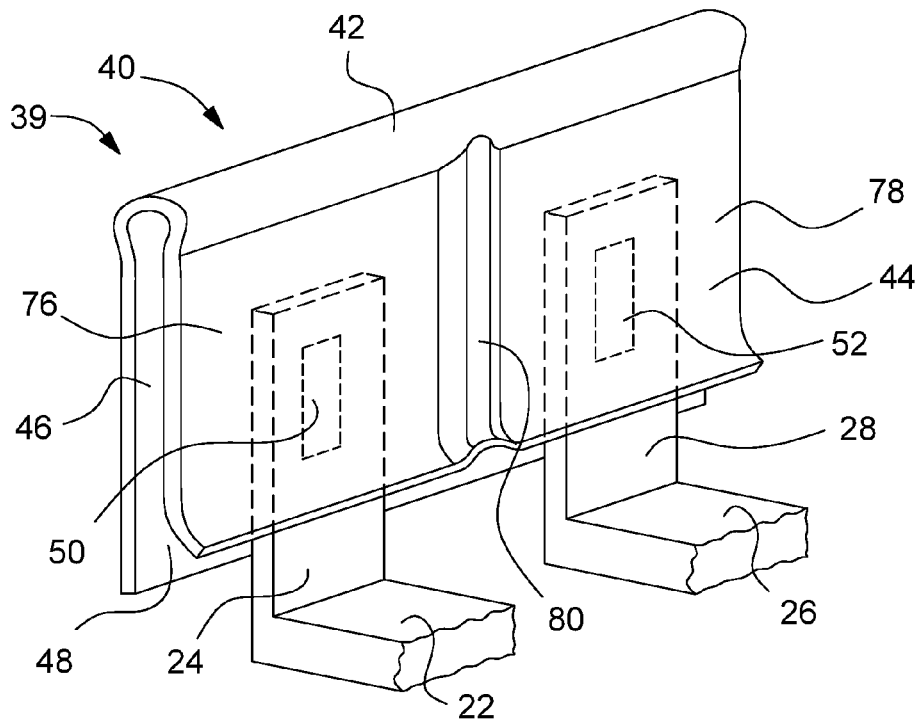
FIG. 9 is a schematic perspective view of a portion of a battery bus bar clip assembly, similar to FIG. 2 but adding a crease.

Referring now to FIG. 9 there is illustrated another embodiment of the battery bus bar clip assembly, indicated generally at 39. Since the bus bar clip assembly 39 in this embodiment is a modification of earlier embodiments, like reference numerals designate corresponding parts in the drawings and detailed description thereof will be omitted. In this embodiment, the first leg 44 is provided with a crease 80. The crease 80 divides the first leg into the first area 76 corresponding to the portion of the first leg 44 contacting the first terminal 24 and the second area 78 corresponding to the portion of the first leg 44 contacting the second terminal 28. The crease 80 produces a spring force, in addition to the force produced by the spring portion 42, ensuring contact between the first and second areas 76 and 78 and the first and second terminals 24 and 28, respectively. The size of the corrugation 80 may be adjusted to increase or reduce flexure of the first leg 44 between the first and second areas 76 and 78 and the first and second terminals 24 and 28, respectively. Flexure between the first area 76 and the second area 78 increases as the size of the crease 80 increases. One skilled in the art will recognize that the crease 80 may be alternatively located in the second leg 46 in lieu of the first leg 44 or in both the first leg 44 and the second leg 46. This crease 80 may also be employed in the clips of any of the previous embodiments discussed herein, if so desired. This crease 80 may also be employed in the bus bar clips of any of the previous embodiments discussed herein if so desired.

One skilled in the art will recognize that the bus bar clip 40 illustrated in FIG. 7 through FIG. 9 can be combined with the substrate 54 of FIG. 3 through 6.

Figure 10:
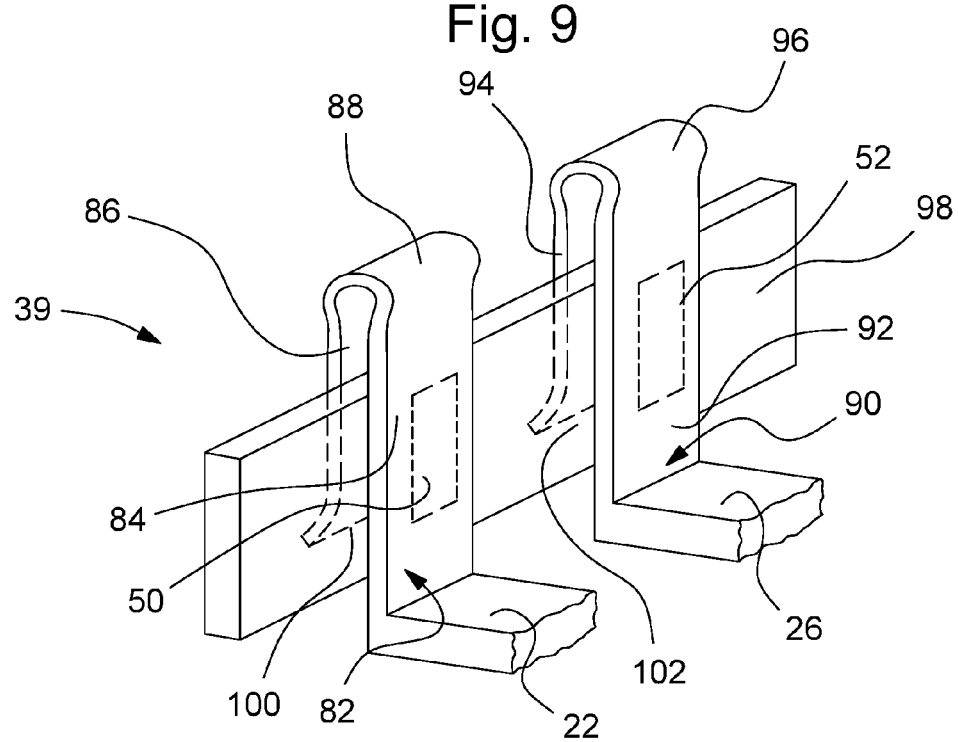
FIG. 10 is a schematic perspective view of a portion of a bus bar clip assembly according to another embodiment.

Referring now to FIG. 10 there is illustrated another embodiment of the battery bus bar clip assembly, indicated generally at 39. The first cell 22 is connected to a first terminal clip assembly, indicated generally at 82, and the second cell 26 is connected to a second terminal clip assembly, indicated generally at 90.

The first terminal clip assembly 82 is provided with a first terminal clip leg 84, a second terminal clip leg 86, and a first spring portion 88. The first leg 84, the second leg 86, and the first spring portion 88 may be integrally formed as a single electrically conductive and weldable piece. The second terminal clip assembly 90 is provided with a third terminal clip leg 92, a fourth terminal clip leg 94, and a second spring portion 96. The third leg 92, the fourth leg 94, and the second spring portion 96 may be integrally formed as a single electrically conductive and weldable piece. The first leg 84 and the second leg 86 are substantially parallel to each other and form a first gap 100 at their distal ends. The third leg 92 and the fourth leg 94 are substantially parallel to each other and form a second gap 102 at their distal ends. A bus bar 98 having opposing sides is inserted into the first gap 100 and the second gap 102. To facilitate insertion into the first gap 100 and the second gap 102, the first terminal clip assembly 82 and the second terminal clip assembly 90 may be free standing extensions with separation from the first cell 22 and the second cell 26, respectively.

The first spring portion 88 biases the first leg 84 and the second leg 86 against the opposing sides of the bus bar 98 and the second spring portion 96 biases the third leg 92 and the fourth leg 94 against the opposing sides of the bus bar 98. The spring force from spring portions 88 and 96 ensure sufficient contact for welding the first terminal clip assembly 82 and the second terminal clip assembly 90, respectively, to the bus bar 98. Once inserted into the first gap 100 and held by the first spring portion 88, the bus bar 98 is welded to the first leg 84 of the first terminal clip assembly 82 to form the first weld 50 and once inserted into the second gap 102 and held by the second spring portion 96, the bus bar 98 is welded to the third leg 92 of the second terminal clip assembly 90 to form the second weld 52. The first weld 50 and the second weld 52 may be made using any suitable method of welding. For example, laser welding may be used to form the first weld 50 and the second weld 52.

Figure 11:
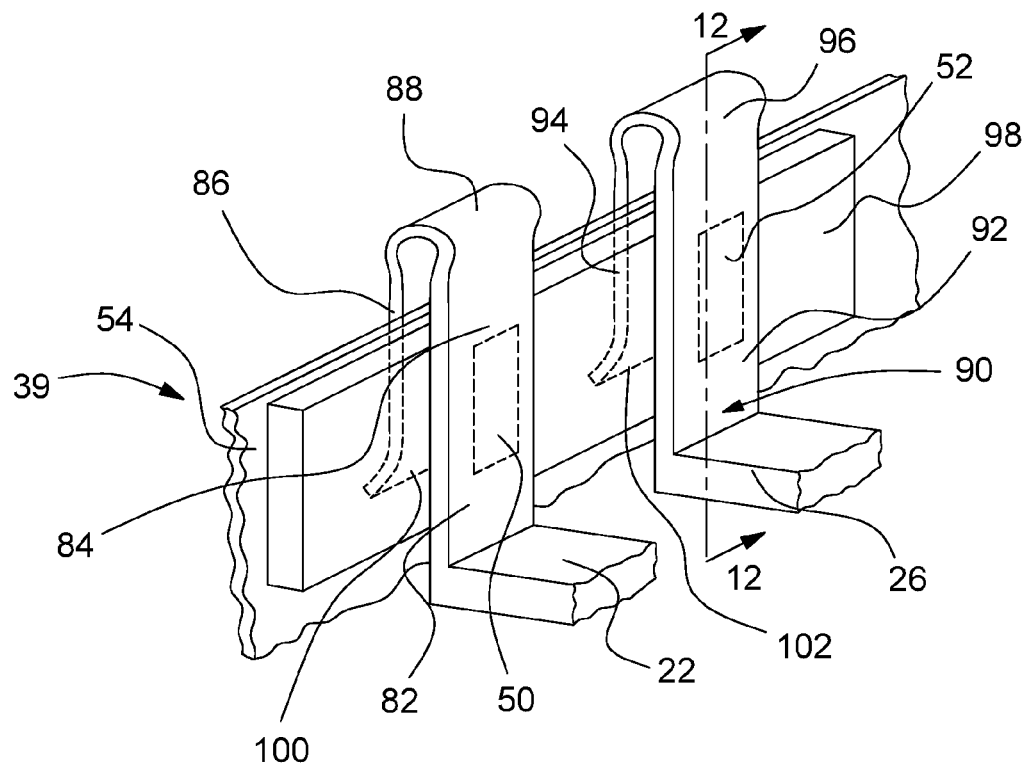
FIG. 11 is a schematic perspective view of a portion of a bus bar clip assembly with a substrate according to the embodiment of FIG. 10.
Figure 12:
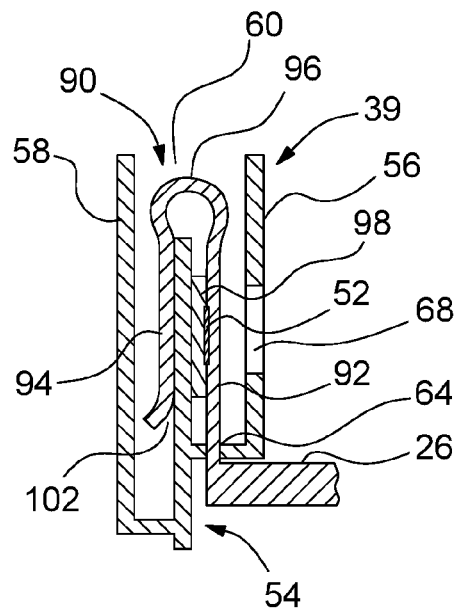
FIG. 12 is a schematic sectional view of a portion of a bus bar clip assembly with a substrate, taken along line 12-12 of FIG. 11.

Referring now to FIG. 11 and FIG. 12 there is illustrated another embodiment of the battery bus bar clip assembly, indicated generally at 39. The first terminal clip assembly 82 is provided with the first leg 84, the second leg 86, and the first spring portion 88. The first leg 84, the second leg 86, and the first spring portion 88 may be integrally formed as a single electrically conductive and weldable piece. The second terminal clip assembly 90 is provided with the third leg 92, the fourth leg 94, and the second spring portion 96. The third leg 92, the fourth leg 94, and the second spring portion 96 may be integrally formed as a single electrically conductive and weldable piece. The first leg 84 and the second leg 86 are substantially parallel to each other and form the first gap 100 and the third leg 92 and the fourth leg 94 are substantially parallel to each other and form the second gap 102, at their respective distal ends. The bus bar 98 and the substrate 54 are inserted into the first gap 100 and the second gap 102. The substrate 54 is made of an electrically insulating material. To facilitate insertion into the first gap 100 and the second gap 102, the first terminal clip assembly 82 and the second terminal clip assembly 90 may be free standing extensions with separation from the first cell 22 and the second cell 26, respectively.

The first spring portion 88 biases the first leg 84 against the bus bar 98 and the second leg 86 against the substrate 54, the second spring portion 96 biases the third leg 92 against the bus bar 98 and the fourth leg 94 against the substrate 54, and both the first and second spring portions 88 and 96 bias the bus bar 98 against the substrate 54. Biasing by the spring portions 88 and 96 ensure sufficient contact for welding the first terminal clip assembly 82 and the second terminal clip assembly 90 to the bus bar 98. Once inserted into the first gap 100 and the second gap 102, the bus bar 98 is welded to the first leg 84 of the first terminal clip assembly 82 to form the first weld 50 and the third leg 92 of the second terminal clip assembly 90 to form the second weld 52, respectively. The first weld 50 and the second weld 52 may be made using any suitable method of welding. For example, laser welding may be used to form the first weld 50 and the second weld 52.

The substrate 54 is provided with the first substrate leg 56 and the second substrate leg 58. The first substrate leg 56 is generally parallel to the first leg 84 and the third leg 92 while the second substrate leg 58 is generally parallel to the second leg 86 and the fourth leg 94. The first substrate leg 56 and the second substrate leg 58 define the housing 60 for the first terminal clip assembly 82, the second terminal clip assembly 90, and the bus bar 98. The substrate 54 is a guard that protects from accidental human contact with the first terminal clip assembly 82, the second terminal clip assembly 90, or the bus bar 98.

Figure 13:
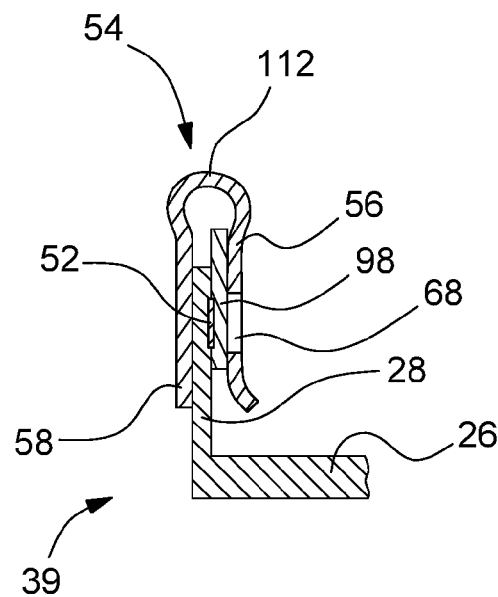
FIG. 13 is a schematic perspective view of a portion of a bus bar clip assembly according to another embodiment.

Referring now to FIG. 13 there is illustrated another embodiment of the battery bus bar clip assembly, indicated generally at 39. Since the bus bar clip assembly 39 in this embodiment is a modification of earlier embodiments, like reference numerals designate corresponding parts in the drawings and detailed description thereof will be omitted. In this embodiment, a substrate spring portion 112 of the substrate 54 is used to secure the second terminal 28 of the second cell 26 for welding to the bus bar 98.

Figure 14:
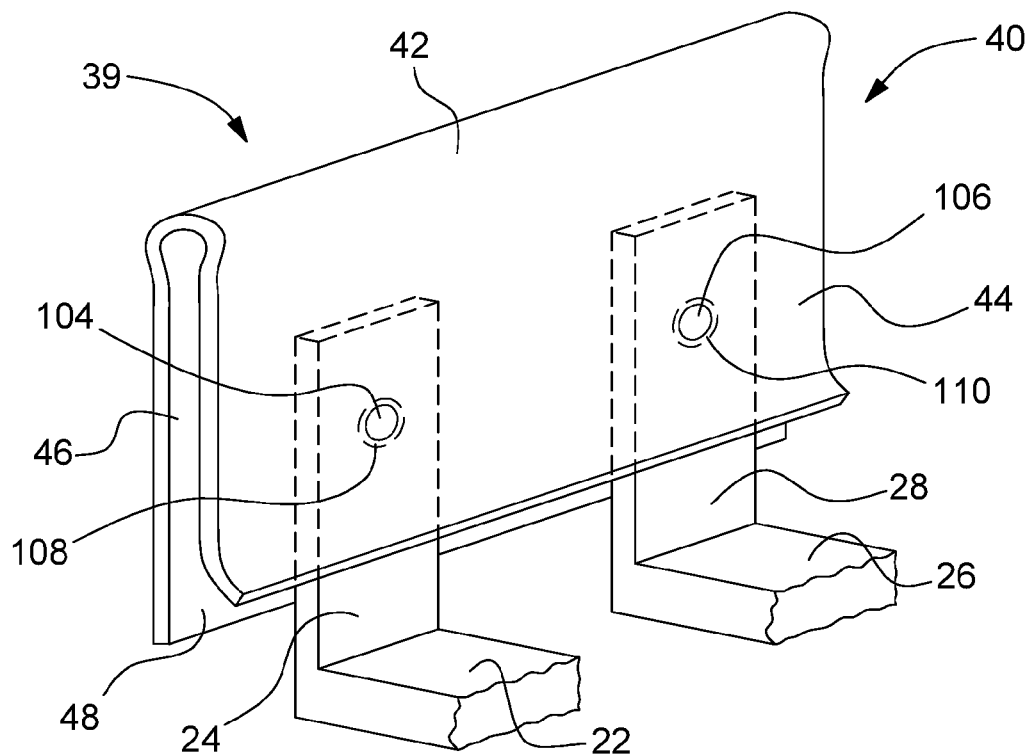
FIG. 14 is a schematic perspective view of a portion of a battery bus bar clip assembly, similar to FIG. 2 but adding a locking means.

Referring now to FIG. 14 there is illustrated another embodiment of the battery bus bar clip assembly, indicated generally at 39. Since the bus bar clip assembly 39 in this embodiment is a modification of earlier embodiments, like reference numerals designate corresponding parts in the drawings and detailed description thereof will be omitted. For clarity, the first weld 50 and the second weld 52 are not illustrated. In this embodiment, the first leg 44 of the bus bar clip assembly is provided with a first dimple 104 and a second dimple 106. The first dimple 104 and the second dimple 106 extend inward towards the gap 48 between the first bus bar clip assembly leg 44 and the second bus bar clip assembly leg 46. The first terminal 24 and the second terminal 28 are provided with a first recess 108 and a second recess 110, respectively. The location of the first recess 108 corresponds to the first dimple 104 and the location of the second recess 110 corresponds to the second dimple 106. The bus bar clip 40 is secured to the first terminal 24 and the second terminal 28 by the first dimple 104 being inserted into the first recess 108 and the second dimple 106 being inserted into the second recess 110. The first dimple 104, the second dimple 106, the first recess 108, and the second recess 110 may be used to prevent misalignment during manufacturing of the bus bar clip assembly 39 or to give feedback during installation of the bus bar clip 40.

While certain embodiments of the present invention have been described in detail, those familiar with the art to which this invention relates will recognize various alternative designs and embodiments for practicing the invention as defined by the following claims.

The invention claimed is:

1. An assembly comprising:
   a battery bus bar clip having a spring portion integrally formed with substantially parallel first and second legs extending therefrom and defining a gap;
   first and second terminals, of a battery, in the gap, wherein the spring portion biases the first and second legs towards opposed sides of the first and second terminals;
   welds attaching at least one of the first and second legs to the first and second terminals.

2. The assembly of claim 1 including a substrate, being electrically insulated, mounted in the gap between the first and second terminals and one of the first and second legs, the substrate having first and second legs providing an electrically insulated guard around the clip and the first and second terminals.

3. The assembly of claim 1 wherein the clip is provided with the spring portion having a notch cutout between the first and second terminals, wherein the cutout is configured to increase flexibility of the first leg between the first and second welds.

4. The assembly of claim 1 wherein the clip is provided with the first leg having a slot between the first and second terminals, wherein the slot is configured to increase flexibility of the first leg between the first and second welds.

5. The assembly of claim 1 wherein the clip is provided with the first leg having a crease between the first and second terminals, wherein the crease is configured to increase flexibility of the first leg between the first and second welds.

* * * * *